W. H. BANKS.
INSECT CATCHING PAN.
APPLICATION FILED DEC. 5, 1916.
1,259,200.
Patented Mar. 12, 1918.
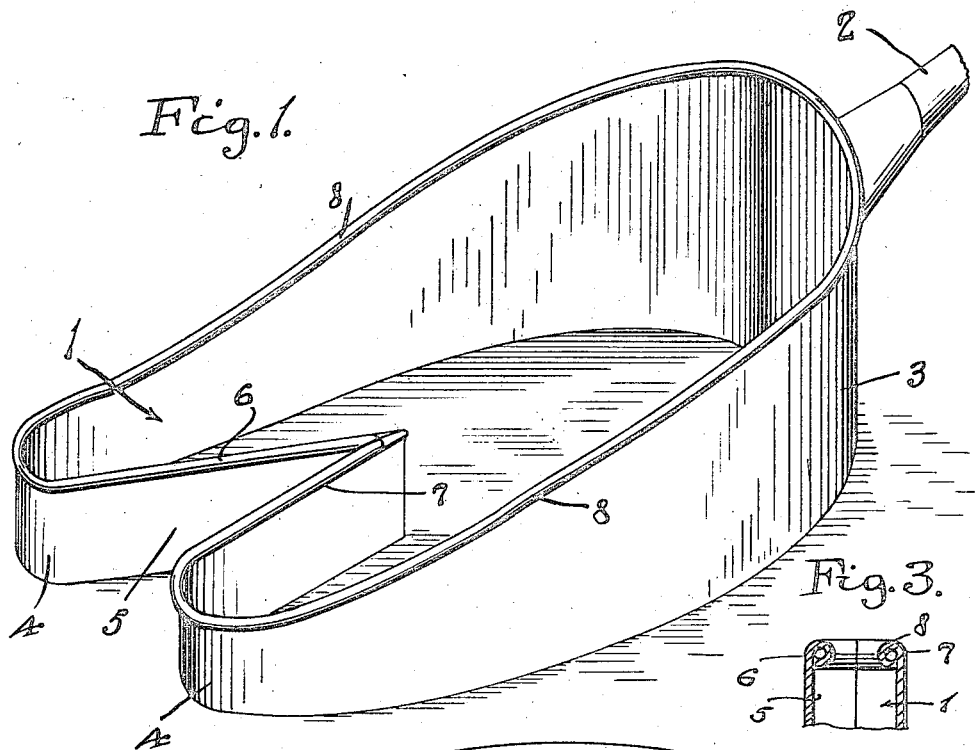
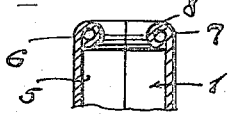
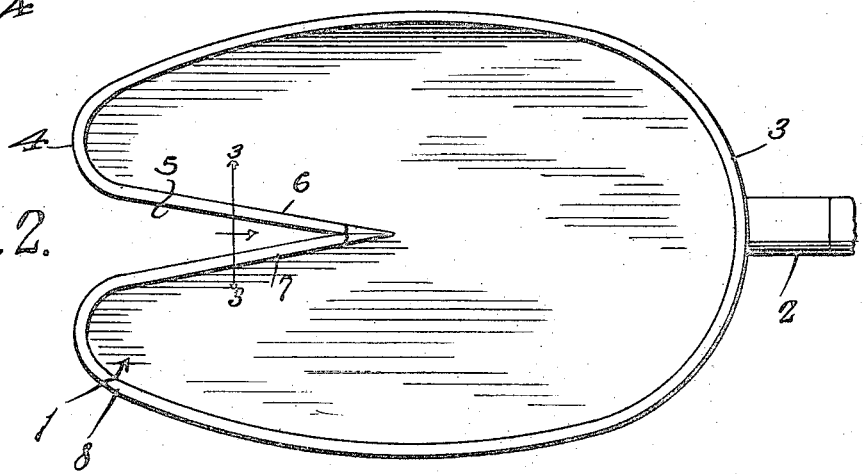
Inventor
W. H. Banks.

UNITED STATES PATENT OFFICE.

WILLIAM H. BANKS, OF HURTSBORO, ALABAMA.

INSECT-CATCHING PAN.

1,259,200.

Specification of Letters Patent.

Patented Mar. 12, 1918.

Application filed December 5, 1916. Serial No. 135,122.

*To all whom it may concern:*

Be it known that I, WILLIAM H. BANKS, a citizen of the United States, residing at Hurtsboro, in the county of Russell and State of Alabama, have invented certain new and useful Improvements in Insect-Catching Pans; and I do hereby declare the following to be a full, clear, and exact description of the invention, such as will enable others skilled in the art to which it appertains to make and use the same.

This invention relates to a pan which is particularly designed for use in catching and exterminating boll weevils.

The primary object of the invention is to provide a pan for retaining kerosene, or a suitable insecticide, which pan is provided with a throat at its forward end for receiving the stalks of a cotton plant so that the weevils may be shaken from the plants into the body of the pan, in which the insecticide is retained, and to dispose the sides of the throat at angles to each other, so that their inner ends will converge whereby the stalk of a plant will be gripped or engaged by the sides of the throat and held against accidental breaking, while the weevils are being shaken therefrom and also so that portions of the pan will project forwardly and laterally from and in close proximity to the plant to prevent weevils from falling upon the ground when the plant is shaken.

With the foregoing and other objects in view, this invention consists in such novel features of construction, combination and arrangement of parts as will be hereinafter more fully described, illustrated in the accompanying drawing and claimed.

In describing the invention in detail, reference will be had to the accompanying drawing wherein like characters designate like and corresponding parts throughout the several views, and in which:—

Figure 1 is a perspective view of the improved pan.

Fig. 2 is a top plan view of the pan, and

Fig. 3 is a section on the line 3—3 of Fig. 1.

Referring more particularly to the drawing, 1 designates the main body of the pan as an entirety, which has a handle 2 attached thereto in any suitable manner. The portion 3 of the pan, adjacent to the handle 2 is higher than the outer end 4 of the pan, as clearly shown in Fig. 1 of the drawing. The pan 1 is provided for retaining an insecticide, such as kerosene, or the like, into which the weevils are shaken from the cotton plants. The forward end 4 of the pan 1 is provided with a centrally disposed throat 5, the sides 6 and 7 of which converge as they extend rearwardly toward the handle 2 of the pan, so that when the pan is moved beneath a cotton plant, the stalk of the plant will be positioned within the throat and engaged by the sides 6 and 7, which will properly position the plants so that the weevils may be shaken therefrom into the interior of the pan 1, and will also brace the stalks of the plant, and decrease the liability of breaking the stalks by the action of knocking or shaking the insects from the plants. The upper edges 8 of the sides of the pan 1 are rolled, as clearly shown in Fig. 3 of the drawing, so as to present curved or rounded surfaces to the plants, and eliminate the liability of cutting the plants by sharp edges.

It is well known that boll weevils, come out of the ground and feed upon the buds of young cotton plants, until the cotton begins to form or make squares, then the weevil punctures the squares and deposits eggs therein, in which manner the propagation of the weevils is carried on. The pan above described is to be filled with kerosene or any suitable liquid insecticide, and while the weevils are feeding upon the buds, the pan is positioned beneath the plant, so that the stalk of the plant will be within the throat 5 and the plant is shaken in any suitable manner, such as by the use of a fly swatter or like instrument, which will shake the weevils from the plant into the pan where they will be destroyed by the insecticide. In case of infected squares on the plants, these squares will be shaken from the plant and the eggs or larvæ will be destroyed. When a plant is positioned in the throat 5 of the pan 3, the sides of the throat will brace the plant and prevent its being broken, when struck with a swatter, and the portions of the pan about each side of the throat will extend laterally and forwardly of the plant in close proximity thereto, so that the pan will receive all the weevils which are shaken from the plant and prevent any of them from falling upon the ground.

In reducing the invention to practice, certain minor features of construction, combination and arrangement of parts may necessitate alterations to which the patentee is entitled provided such alterations are comprehended within the scope of what is claimed.

What is claimed is:—

An insect destroying pan of substantially oval shape having a substantially V-shaped throat extending inwardly from the forward end of the pan, the sides of said throat adapted to grip the stalk of the plant for bracing the plant against accidental breaking, the portion of said pan upon each side of said throat adapted to extend laterally and forwardly of the plant in close proximity thereto, as and for the purpose specified.

In testimony whereof I affix my signature in presence of two witnesses.

WILLIAM H. BANKS.

Witnesses:
C. P. GLASS,
H. L. DAVIS.

Copies of this patent may be obtained for five cents each, by addressing the "Commissioner of Patents, Washington, D. C."